United States Patent
Zhao et al.

(10) Patent No.: US 8,010,475 B2
(45) Date of Patent: Aug. 30, 2011

(54) ONLINE FAULT DETECTION AND AVOIDANCE FRAMEWORK FOR DISTRIBUTED FACTORY CONTROL SYSTEMS

(75) Inventors: Peng Zhao, Rockville, MD (US); Yan Lu, West Windsor, NJ (US)

(73) Assignee: Siemens Corporation, Iselin, NJ (US)

( * ) Notice: Subject to any disclaimer, the term of this patent is extended or adjusted under 35 U.S.C. 154(b) by 783 days.

(21) Appl. No.: 12/101,294

(22) Filed: Apr. 11, 2008

(65) Prior Publication Data

US 2008/0255682 A1  Oct. 16, 2008

Related U.S. Application Data

(60) Provisional application No. 60/911,530, filed on Apr. 13, 2007.

(51) Int. Cl.
G06F 17/00 (2006.01)
G06N 5/02 (2006.01)

(52) U.S. Cl. .......................................................... 706/46
(58) Field of Classification Search .................. None
See application file for complete search history.

(56) References Cited

U.S. PATENT DOCUMENTS 6,751,619 B1 *  6/2004  Rowstron et al. ................... 1/1

FOREIGN PATENT DOCUMENTS

| EP | 1 022 631 A2 | 7/2000 |
|---|---|---|
| WO | 02/071360 A1 | 9/2002 |
| WO | 02/099550 A1 | 12/2002 |

OTHER PUBLICATIONS

'Analysis of hierarchical control architectures: a petri net approach': Jafari, 1991, IEEE, ch2969-4/91/0000/2536, pp. 2536-2541.*
'Diagnosis of sensor and actuator faults of a class of hybrid systems based on semi-qualitative method': Zhao, 2004, IEEE, 0-7803-8273-0/04, pp. 1771-1774.*
'Monitoring and fault detection in shop floor using tiem petri nets': Srinivasan, 1991, IEEE, 0-7803-0233-8/91, pp. 355-360.*
'A tasking deadlock detector for Ada programs': Cheng, 1991, IEEE, 0730/3157/91/0000/0056, pp. 56-63.*
Chen et al., "Pinpoint: Problem Determination in Large, Dynamic, Internet Services", Proc. of Int'l Conf. on Dependable Systems and Networks (IPDS Track), 2002.
Lapp et al., "Computer-aided Synthesis of Fault Trees", IEEE Transaction of Reliability Engineering, vol. 26, No. 1, pp. 2-13, Apr. 1977.
DeVries, "An Automated Methodology for Generating a Fault Tree", IEEE Transaction of Reliability, vol. 39, pp. 76-86, 1990.
Sethi, "Probabilistic Fault Diagnosis in Communication Systems Through Incremental Hypothesis Updating", Computer Networks 45, 2004.
Zhao et al., "A Failure/Fault Diagnoser Model for Autonomous Agents Under Presence of Disturbances", IEEE International Conference on Systems, Man, and Cybernetics, 2006.

(Continued)

Primary Examiner — Omar Fernandez Rivas
Assistant Examiner — Peter Coughlan (57) ABSTRACT

An on-line fault detection and avoidance method is provided for industrial control systems that include multiple interacting process controllers. The method addresses the problem that not all faults can be determined and removed at the time of system design and testing. When a fault translates into a time-out condition in one or more controllers, symptoms are identified, persistence is measured, other involved controllers are identified, the fault condition is identified and control laws are reconfigured to avoid the fault condition in the future.

24 Claims, 9 Drawing Sheets

OTHER PUBLICATIONS

Leveson, "A Systems-Theoretic Approach to Safety in Software—Intensive Systems", IEEE Trans. on Dependable and Secure Computing, 2005.

Pinzon et al., "A Comparative Study of Synthesis Methods for Discrete Event Controllers", Journal of Formal Methods in System Design, vol. 15, No. 2, 1999.

Pencole, "Decentralized diagnoser approach: Application to telecommunication network", Proc. of Dx 2000, Eleventh International Workshop on Principles of Diagnosis, pp. 185-193, Jun. 2000.

Karp, "Autonomic Computing", 2002, http://www/nwfusion.com/newsletters/stor/2002/01573948.html.

Mutchell et al., "A Distributed Algorithm for deadlock Detection and Resolution", ACM Symp. on Principles of Distributed Computing, 1984.

Srinivasan et al., "Fault Detection/Monitoring Using Time Petri Nets", IEEE Trans. on SMC, vol. 23, No. 4, 1993.

Zhao, "Distributed System With Self-Diagnosis and Self-Healing", PhD thesis, Rutgers University, 2007.

* cited by examiner

ONLINE FAULT DETECTION AND AVOIDANCE FRAMEWORK FOR DISTRIBUTED FACTORY CONTROL SYSTEMS

CLAIM OF PRIORITY

This application claims priority to, and incorporates by reference herein in its entirety, pending U.S. Provisional Patent Application Ser. No. 60/911,530, filed Apr. 13, 2007, entitled "Online Fault Detection and Avoidance Framework for Distributed Systems."

FIELD OF THE INVENTION

The present invention relates generally to the field of dependability in industrial factory control systems. More specifically, the invention relates to fault detection and fault avoidance in multi-controller industrial control systems.

BACKGROUND OF THE INVENTION

Dependable systems are characterized by their level of fault tolerance, safety, and reliability, amongst others. While those terms are often used in the literature interchangeably, there are profound differences among them. For example, reliability deals with component failures and their impact on the system availability. Failed components could conceivably cause unsafe system conditions, not necessarily due to the failure itself, but because of lack of sufficient constraints around the conditions caused by the failure.

Safety, on the other hand, is a control and or data related issue. Unsafe conditions occur because of lack of sufficient control within the system. Insufficient or invalid data could also create unsafe conditions.

The question as how to deal with an unsafe condition or a fault condition depends on the application and type of fault. In some control applications, a failsafe state is reached by shutting down the system or part of it when a critical fault occurs. Determining the root cause of the problem may not be the primary goal to reach, because as long as the system safely shuts down following a fault condition, that may be sufficient for failsafe operation. In other applications, system shut down is not necessarily a feasible solution. Instead, a set of actions ensuring transition to a safe operational condition is required.

Fault tolerance has traditionally been associated with defining a level of redundancy for the system components and/or connectivity between those components. While that has proved to be essential for safety-critical systems, it is a solution tailored mostly towards overcoming reliability problems and, in some cases, data related issues. Redundancy can be applied at both the hardware and software levels. Exemplary software failsafe techniques include complement data read/write, checksum comparison, redundant coding and orthogonal coding. The effectiveness of redundancy solutions on problems originating from the lack of sufficient control on system operation is quite debatable. That is because the lack of proper control laws must be the same in both primary and secondary systems. Furthermore, redundant solutions can only be made for those sources of problems that are known in advance.

Fault Analysis at Design & System Testing Stage

A common approach to develop fault tolerant or safe systems has been for the design team to spend an extensive amount of time and effort at the control system design stage, followed by extensive testing and validation after the system is built. There are a number of semi-formal techniques, mainly borrowed from reliability engineering, that can facilitate the above analysis. Examples include FTA (Fault Tree Analysis) and FEMA (Fault modes and effect analysis). FTA is a deductive technique used to identify the specific causes of potential undesirable conditions. The top event in the tree is a previously known potential condition. In principle, it is similar to backward diagnosis which utilizes a backward chaining logic in order to determine the sequence of events and conditions leading to a given failure. Such techniques are described, for example, in the following: D. Swaroop, "String Stability of Interconnected Systems," PhD thesis, the University of California, Berkeley, 1994; S. Lapp and G. Powers, "Computer-aided Synthesis of Fault Trees," IEEE Transaction of Reliability Engineering, Vol. 26, No. 1, pp. 2-13, April 1977; A. Misra, "Sensor-Based Diagnosis of Dynamical Systems," PhD thesis, Vanderbilt University, 1994; R. De Vries, "An Automated Methodology for Generating A Fault Tree," IEEE Transaction of Reliability, Vol. 39, pp. 76-86, 1990; and M. Sampath, "A Discrete Event Systems Approach to Failure Diagnosis," PhD thesis, University of Michigan, 1995.

FEMA is an inductive analysis technique used to identify and evaluate potential undesirable conditions, and to determine control actions to eliminate or reduce the risk of those conditions. Another approach is the forward diagnosis approach, where state hypotheses are made in the model and updated according to current events and sensor readings until a conclusion is made. That approach is described by M. Steinder and A. S. Sethi, "Probabilistic fault diagnosis in communication systems through incremental hypothesis updating," Computer Networks 45, 2004; A. Misra, "Sensor-Based Diagnosis of Dynamical Systems," PhD thesis, Vanderbilt University, 1994; and P. Zhao, A. Amini, M. A. Jafari, "A Failure/Fault Diagnoser Model for Autonomous Agents under Presence of Disturbances," IEEE International Conference on Systems, Man, and Cybernetics, 2006.

In the last decade there has been considerable R&D work on establishing more formal approaches to safety, fault and hazard analysis, but from a control perspective. One example is the work performed by an MIT group, described, for example, in N. Leveson, "A Systems-Theoretic Approach to Safety in Software—Intensive Systems," IEEE Trans. on Dependable and Secure Computing (2005). The main thrust of that work is to minimize software faults and hazards at the design stage by formalizing software requirements, simulating and analyzing the design prior to implementation. In STAMP (Systems-Theoretic Accident Modeling and Process) methodology developed by that team, the cause of an accident, instead of being understood in terms of a series of failure events, is viewed to be the result of a lack of constraints imposed on system design and operations. STAMP uses concrete models of the underlying processes. It is assumed that any controller, human or automated, must contain a model of the system being controlled. Whether the model is embedded in the control logic of an automated controller or in the mental model of a human controller, it must contain the same type of information: the required relationship among the system variables (the control laws), the current state (the current values of the system variables), and the ways the process can change state. Accidents, particularly system accidents, are then viewed as inconsistencies between the model of the process used by the controllers (both human and automated) and the actual process state. The above methodology is now in use in some application areas, such as aerospace and aeronautics.

A similar paradigm has also been promoted by a different research community working on event driven systems modeling, such as Petri nets, NCES, temporal logic, and other state/transition systems. Generally speaking, a single model of the controlled closed loop behavior of the system is used, containing both the underlying process and the control actions. Through the analysis and evaluation of that model, one can identify, a priori, the undesirable states potentially reachable by the system. For instance, using Petri net theory, one can mathematically establish such conditions as un-boundedness, different levels of liveness, some deadlock conditions, etc. A comprehensive review of those methodologies is presented in L. E. Pinzon, H. M. Hanisch, M. A. Jafari and T. O. Boucher, "A Comparative Study of Synthesis Methods for Discrete Event Controllers," Journal of Formal Methods in System Design, Vol. 15, No. 2, 1999.

While each stand alone agent (or system component or controller) is simpler to design and control, developing a safe and dependable distributed multi-agent system is far challenging than its centralized counterpart, due to the distributed nature of information and control. For distributed fault analysis, one must deal with a number of major issues: a) Which agent should initiate the fault detection/diagnosis? b) What information should be exchanged? How should the exchange proceed? Which agents should be involved? c) How should the same fault be avoided in the future? d) What information must be kept for avoidance, prevention or recovery in the future?

The extension of failure analysis to distributed systems has been done in the literature in two ways. First, centralized control is directly extended to distributed systems so that each agent has its own local analysis engine, while there is also a global coordinator that communicates with the local ones when necessary. Each agent is assigned a set of observable events, and it locally processes its own observation and generates its diagnostic information. Some of that information is then communicated to the global coordinator as needed. The type of information communicated is determined by the communication rules used by the agents. The task of the coordinator is to process the messages received from each agent, and to make proper inferences on the occurrences of failures, according to some prescribed decision rules. An example of the first approach is presented in R. Debouk, "Failure Diagnosis of Decentralized Discrete-Event Systems," PhD thesis, University of Michigan, 2000.

In the second approach each agent receives and processes locally and from its neighbors. That approach is more suitable for distributed systems, but it can hardly outperform the centralized one, since none of the agents can have more information than the coordinator in the first approach. Examples of that approach include Y. Pencole, "Decentralized diagnoser approach: Application to telecommunication network," in Proc. of DX 2000, Eleventh International Workshop on Principles of Diagnosis, pp. 185-193, June 2000; and R. Sengupta, "Diagnosis and Communication in Distributed Systems," in Proc. of WODES 1998, International Workshop on Discrete Event Systems, pp. 144-151, Published by IEE, London, England, August 1998.

Online, Run Time Fault Analysis

The above approaches, though pro-active, assume that fault or undesirable conditions are determined in advance, either at the design or testing stage. The problem is that, in practice, very often the balance between the economics and safety or fault tolerance becomes important. Hence, design and pre-programming almost certainly concludes with not having included all the possible fault conditions. It is arguably true that for a reasonably complex system the problem of identifying all the fault conditions is "un-decidable." Furthermore, in many real-life applications and especially in complex distributed systems, the occurrence of faults is often time-dependent, with their likelihood changing with the system's operational schedule. Furthermore, faults may occur due to inadequate coordination among different controllers or decision makers, including unexpected side effects of decisions or conflicting control actions. Communication flaws and invalid data could also play an important role in the occurrence of faults, with many of those circumstances quite difficult to predict in advance.

A recent alternative to the above approach has been to address safety issues in an "online" basis as faults occur. The majority of the work in that area has been in computing and computer networking. Examples include the concept of autonomic computing by IBM and the work done by the researchers at the Berkeley/Stanford Recovery Oriented Computing (ROC) Laboratory. The common underlying assumption in that work is that there is no way to prevent obscure and unexpected faults from happening, and not all those faults can be identified at the design stage. Autonomic computing refers to building computer hardware/software and networks that can adapt to changes in their environment, strive to improve their performance, heal when damaged, defend themselves against attackers, anticipate users' actions, etc. The work by the ROC lab centers around a similar concept but for distributed systems by making the system more adaptable to its environment, so that faults can be promptly detected, efficiently contained, and recovered from without requiring the whole system to shut down.

The online approaches improve system dependability by embedding a high level of intelligence into the system control. The potential non-determinism, however, in terms of response time and outcome, could arguably make those approaches unworkable for safety-critical applications. On the other hand, relying only on a pre-programmed automation, with some level of fault tolerance determined at the design or testing stage, will not make systems immune to unexpected faults and hazards, as many real life incidents have shown in the past. Therefore, it is the inventors' belief that in order to maximize system safety and dependability, one must take a hybrid approach: i) pro-actively attempt to identify as many fault and undesirable conditions as possible at design and system testing stages; and ii) embed some reasonable level of intelligence into the control system so that when a fault occurs, it is effectively detected and appropriate remedies are made at run time.

There is one more reason to justify the online approach. Suppose it is technologically possible to build a simulation of the underlying "plant" normative and disruptive dynamic behavior (to the extent known in advance). In the assumed distributed system, the plant model will be a network of individual agent models. Now suppose that the simulation includes an initial control design (call it "first level of approximation") and have it work in closed loop with the simulated plant model. Assuming that the simulation runs for a sufficient amount of time, it should be possible to observe some unknown fault conditions. Now if the controller has embedded in it, the intelligence proposed by the inventors herein, it should be possible to detect, diagnose and avoid the observed fault conditions. With every newly discovered major fault condition, the control system is up-graded to a higher level of approximation.

There is therefore presently a need to provide a highly effective framework for fault detection and fault avoidance in multi-controller industrial control systems. To the inventors' knowledge, no such technique is currently available.

SUMMARY OF THE INVENTION

The present invention addresses the needs described above by providing a method for detecting and avoiding faults in a distributed factory control system having a plurality of industrial controllers. In the distributed factory control system, each controller controls at least one underlying process. The method includes the following steps. In a first controller, a symptom of a fault condition is identified by identifying a deviation of a state of an underlying process controlled by the first controller from a corresponding state kept by the controller. In the first controller, a persistence of the symptom is measured, and the symptom is ignored if the measured persistence is below a threshold value.

Other controllers involved in the fault condition are found by generating in at least the first controller a search tree having leaf nodes that are monitored conditions. The fault condition, including identifying states of the other controllers involved in the fault condition, is next identified. Control rules controlling states of the involved controllers are then reconfigured to avoid the fault condition in the future.

The step of identifying a symptom of a fault condition may further include identifying the state of an underlying process controlled by the first controller by observing sensory devices associated with the underlying process.

The step of identifying a symptom of a fault condition may include modeling in the first controller at least one underlying process using a time Petri net.

The step of finding other controllers involved in the fault condition may further comprise starting the search tree at a state where place p1 of a time Petri net is marked for an amount of time $\phi \geq THT_{max}(p_1)$ where $THT_{max}(p_1)$ is a maximum token holding time of place $p_1$.

The step of finding other controllers involved in the fault condition may further comprise, if none of the leaf nodes of the search tree in the first controller exceeds its maximum token holding time, then generating a search tree in a second controller starting at a place q of a time Petri net that is an output of a transition $t_1$ to which $p_1$ is an input; and creating a chain of controllers by repeating the generating a search tree step in additional controllers until one of the following conditions is met: a) maximum token holding time condition is not exceeded in any leaf node in a search tree; b) none of the places in a controller where the maximum token holding time has been exceeded lies in any path with places or transitions connected to other controllers; and c) a search tree within a controller contains only null-cycles.

The step of identifying the fault condition may further include analyzing a search tree of a last controller in the chain of controllers where maximum token holding time has been exceeded. The step of identifying the fault condition may further comprise generating in the first controller a Task-Wait-For graph using state information acquired from at least one other controller.

The step of reconfiguring control rules controlling states of the involved controllers to avoid the fault condition in the future may further comprise transmitting from the first controller to at least one active controller associated with the fault condition a list of "to avoid" states. In that case, the method may further include the steps of receiving at the first controller a state of each controller associated with the fault condition, and comparing the received states with the list of "to avoid" states to determine whether to disable a transition that is within the first controller's control. The first controller may control a process performed on a part, in which case a state of the first controller includes a state of the part.

Another embodiment of the invention is a computer program product including a computer readable recording medium having recorded thereon a computer program comprising code means for, when executed on an industrial controller, instructing the controller to control steps in the above methods.

DESCRIPTION OF THE INVENTION

The present description focuses on factory control related issues, and specifically addresses the example of deadlock conditions in manufacturing operations. A framework is presented for an embedded intelligence in the control system so that previously unknown conditions (not pre-programmed into the factory system control) are detected at run time and avoided thereafter. It is assumed that the nature of the fault is known, but how and when it can happen, who will be involved, and how it can be avoided in the future are not known. While the invention is described with reference to the example of deadlocks in a factor control environment, the underlying concepts are applicable to other types of faults.

The invention is a modular framework and method, and is deployed as software as an application program tangibly embodied on one or more program storage devices. The application may reside in each of a plurality of interconnected industrial controllers in an industrial control system. The industrial controllers control underlying processes in the system. The framework may be accessed by a user through a graphical user interface (GUI). The application code for execution can reside on a plurality of different types of computer readable media known to those skilled in the art.

The Framework

The present invention addresses a distributed system of industrial process controller $A_j = \{A_j\}$. Each process controller includes sufficient processing power to act as an agent in the distributed factory control environment. A controller is assumed to have its own set of basic functions, set of local rules, and must also adhere to a set of global rules. The following algorithm is proposed to be embedded in one or more controllers in a factory control system.

Algorithm:

```
Begin Loop
    Identification of Symptoms;
        - Run Method (Identify_symptoms).
        - Run Method (Measure_persistance_of_Symptom)
        - If Measure_persistance_of_Symptom returns a value
          too high, go to next step, otherwise, do nothing.
    Root - cause analysis:
        - Run Method (Find_Other_controllers_involved)
        - Run Method (Identify_Fault_Condition)
        - If Identify_Fault_Condition returns a fault condition
          then go to next step, otherwise, do nothing - wait until
          the symptoms disappear.
    Reconfigure control laws;
        - Run Method (Reconfigure_Control_Laws).
End Loop
```

In principle, the above framework is general, but the details and complexity of each of the above methods varies from one application to another. Here, a solution approach is outlined for each of the methods appearing in the algorithm, while noting that those approaches may be applicable only to particular applications. An illustrative example is presented dealing with deadlock conditions in manufacturing applications.

Method (Identify_symptoms)

It is assumed that online fault analysis is initiated by a process controller facing a "symptom." The term symptom is used loosely here, and refers to any non-normative condition experienced by a controller at any given time. For instance, when a controller expecting a response from another controller does not receive it within a pre-specified time window, that controller is said to be experiencing a symptom. Similarly, any deviation between the actual state of a process, and that kept by the process controller, can be considered a symptom. Both cases require that the controllers have some knowledge (model) of their underlying processes. An example of such model represented by the Petri net (or "PN") 100 shown in FIG. 1. For that illustrative example, the controller 10 labeled $A_1$ is a machine controller controlling a machine $M_1$ and the controller 130 labeled $A_2$ is a robot controller controlling a robot $R_1$. Controller 120 (labeled $A_3$) and controller 140 (labeled $A_4$) are also illustrated. The figure shows communication links between controllers. For example, a connection 115 between place $q_1$ and transition $t_1$ represents a service request from $R_1$ by $M_1$.

Consider a time-out or watch dog monitoring scenario. That problem has been studied in the literature in great length for centralized systems. Some of those results can be extended to distributed systems as well. For instance, as proposed by V. S. Srinivasan and M. Jafari, "Fault Detection/Monitoring Using Time Petri Nets," IEEE Transaction on System, Man and Cybernetics, Vol. 23 No. 4 July/August 1993, the underlying process may be modeled by a time Petri net (TPN). Here the events are presented by transitions and the conditions presented by places. A time window $(\tau_{i_{min}}, \tau_{i_{max}})$ for transition $t_i$ is defined, where those times are measured relative to the time $t_i$ is enabled. The dynamics of the system in terms of its states and the time windows are captured in a system of homogeneous non-equalities, generated by backfiring transitions. The time to backfire a transition is parameterized by $\theta_i$, and defined according to the time windows of transitions enabled at the same time or of transitions which were backfired and resulted in enabling $t_i$. Any drift from the observed state of the underlying process (obtained through sensory devices) and the controller state is analyzed through a solution to this system of non-equalities. Srinivasan and Jafari also presented a technique to compute maximum token holding time for places. Next is outlined an extension of their methodology to distributed systems.

Suppose that the method starts from an initial state $s_0 \in S_p$ where $S_p$ is the set of all Petri net markings where place p is marked, and backfires an ordered sequence $\upsilon_{s_0}$ of transitions to reach state s, where p is no longer marked. Let $\Psi$ be the set of states visited in this firing sequence. The following can be defined:

$$\Omega_s = \bigcup_{t \in \upsilon, s_i \in \Psi} \Gamma_{t_i, s_i}$$

where $$\Gamma_{t_{r-1}, s_{r-1}} = \begin{cases} \theta_{r-1} - \theta_{t_j} \le \tau_{i_{max}} & \forall\, t_i \in T_{s_{r-1}} \\ \tau_{j_{min}} \le \theta_{r-1} - \theta_{t_j} & \forall\, t_j \in T_{s_{r-1}} \cap H_{s_{r-1}} \text{ and } t_j \ni T_{s_r} \end{cases}$$

It is noted that transition $t_i$ was enabled as a result of backfiring another transition, say t. Therefore, the time $\theta_{t_i}$ at which transition $t_i$ was enabled, is the same as the time $\theta_t$ at which transition t was backfired. Therefore, in the above equations, each $\theta$ can be viewed as a backfiring time of a transition. Given that $\tau_{i_{min}}$ and $\tau_{i_{max}}$ are just given constants, we can re-write the above equations as $$\Omega_s \subset \bigcup_{j=1}^{n} \bigcup_{i=0}^{j} (L_{ij} \le \theta_j - \theta_i \le U_{ij}).$$

Figure 1:
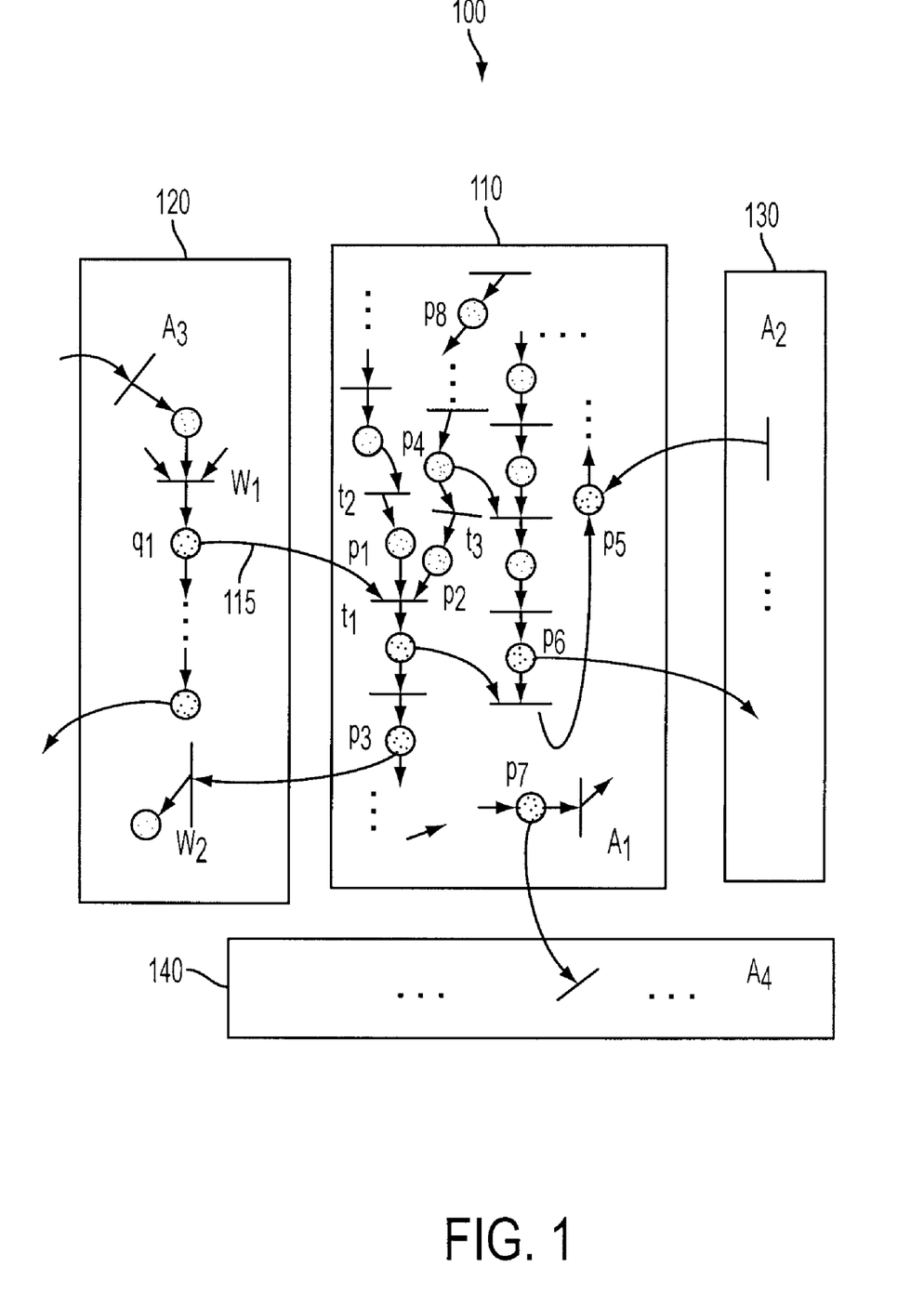
FIG. 1 is a schematic diagram showing a time Petri net model of a distributed system.
Figure 2:
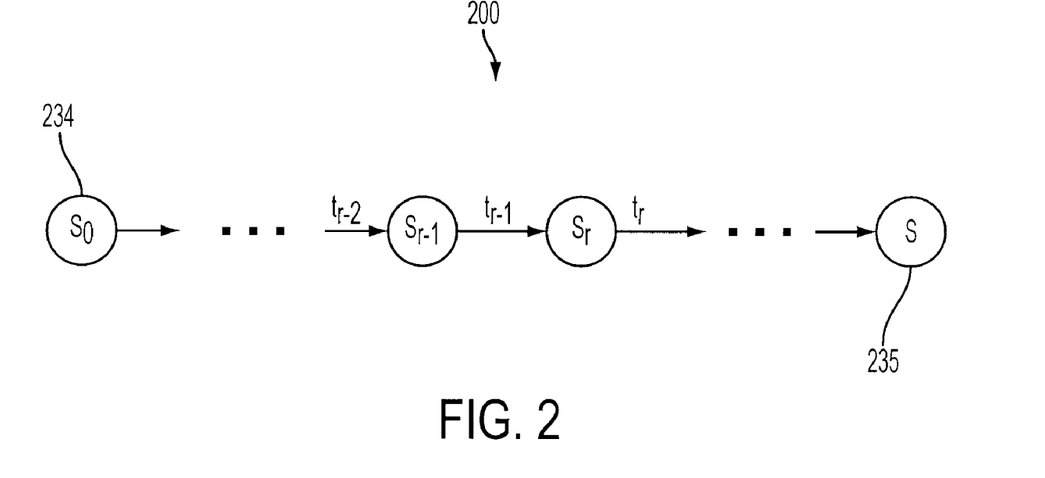
FIG. 2 is a schematic diagram showing a sequence of states and transitions over which a maximum token holding time is computed according to one embodiment of the invention.

The significance of the above relationship is that the set of inequalities at any given state in the backfiring sequence can be described in terms of starting time $\theta_0$ and the set $\{\theta_1, \theta_2, \ldots, \theta_n\}$ of backfiring times of the transitions in the sequence. The above set of constraints can be used to compute the maximum token holding time in any given place:

$$THT_{max}(p) = \max_{s_0 \in S_p} \max_{\upsilon_{s_0}} THT_{max}(p)_{s_0, \upsilon_{s_0}}$$

where $THT_{max}(p)_{s_0, \upsilon_0}$ is computed over $\Omega_s$. As shown in the sequence of states and transitions 200 of FIG. 2, the maximum token holding time is generated from the sequence of transition backfiring starting from a starting state 234 labeled $s_0 \in S_p$, and ending at state 235 labeled s. Similarly, one can compute $THT_{min}(p)$. If sequence $\upsilon_{s_0}$ leads to a transition (see $t_1$ of controller $A_1$ in FIG. 1) with an input condition from another controller ($A_3$ here), controller ($A_3$ must communicate to $A_1$ one of the following: the maximum and minimum token holding times of all the places that feed to $t_1$, or the effective time windows of all the transitions that feed to places in ($A_3$ with output connections to transition $t_1$ in $A_1$. At the same time if $\Psi$ includes a state where place p (e.g., $p_5$ in FIG. 1) is marked with input transition(s) from another controller (controller $A_2$ here), controller $A_2$ must communicate to $A_1$ the effective time windows of all those transitions. It is noted that effective time windows could be shorter than the originally assigned time windows due to conflict resolution or scheduling schemes. It is assumed that such communication between controllers is possible and that the data communicated is reliable. In the cases that such communication is not possible or data is not fully reliable, each controller must then formulate its own perception of the other controllers, by estimating those parameters. That raises the issues of risks and errors in estimation of those parameters. For more discussion on this subject refer to P. Zhao, A. Amini, M. A. Jafari, "A Failure/Fault Diagnoser Model for Autonomous Agents under Presence of Disturbances," IEEE International Conference on Systems, Man, and Cybernetics, 2006.

Method (Measure_persistance_of_Symptom)

Persistence of a symptom will result in the initiation of a root-cause analysis by the controller experiencing it. Persistence is an application-dependent measure which must be quantified in terms of a time window, frequency of occurrence, patterns, severity or complexity of the symptom. If the persistence of a given fault is found to be below a predefined threshold, that fault may be ignored by the method of the invention.

Method (Find_Other_controllers_involved)

Figure 3:
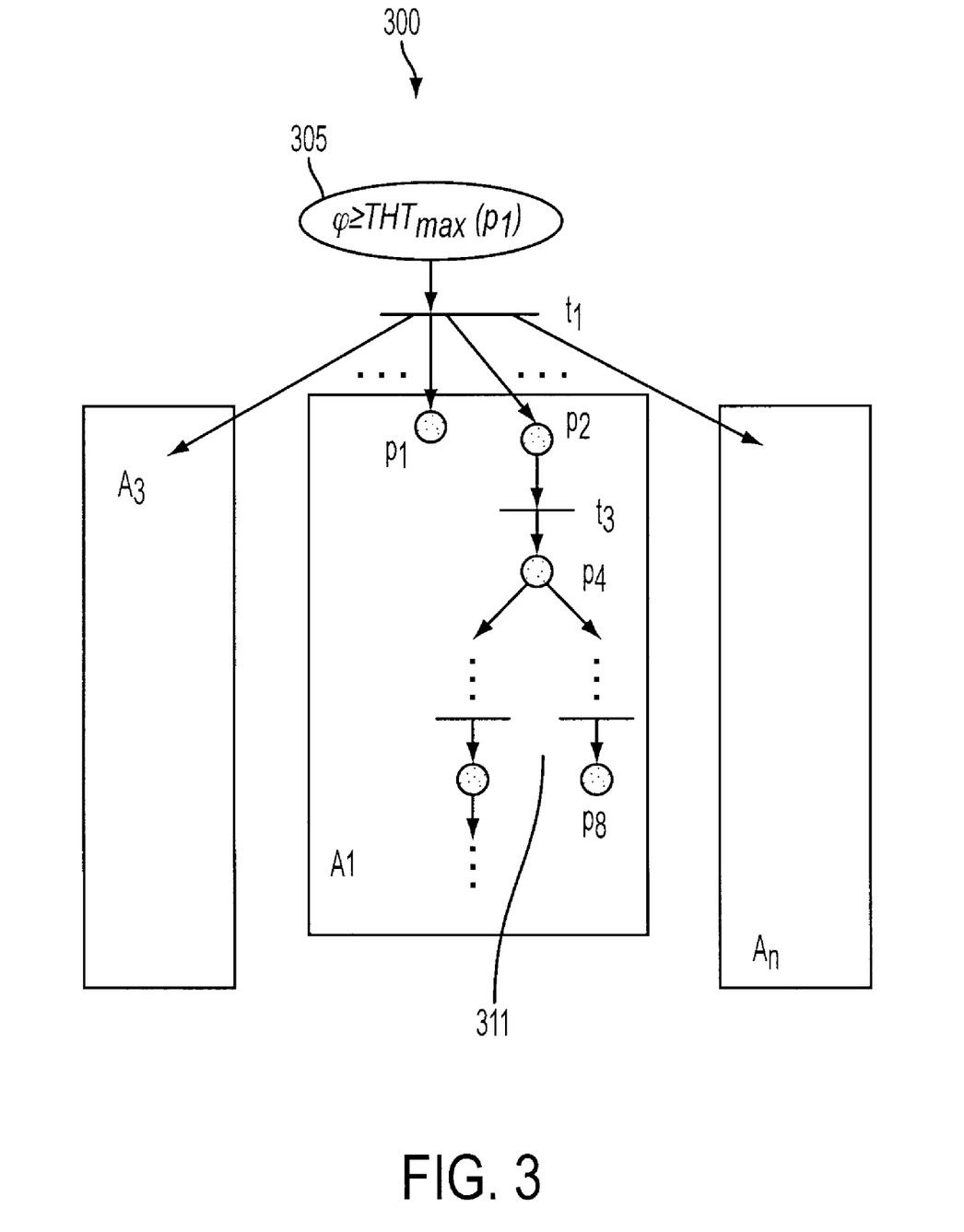
FIG. 3 is a schematic diagram showing generation of a search tree according to one embodiment of the invention.

The solution to the problem of finding controllers that could potentially be accountable to the symptom identified, depends on (i) the extent of condition monitoring done by each controller, and (ii) the level of details that the controller has on its own underlying processes and those of other controllers. For example, consider a case where a controller $A_j$ monitors only some of its internal conditions, but the controller's model of its underlying processes is complete. For the example, that means that the machine $M_1$-controller keeps all the states and events associated with $M_1$. Now assume that place $p_1$ has timed out; i.e., it had a token for longer than its maximum holding time. For the illustrative example, that means that machine $M_1$-has waited too long to receive a service from robot $M_4$. $A_1$ generates a search tree 300 starting from a state 305 where place $p_1$ is marked for an amount of time $\phi \geq THT_{max}(p_1)$, as shown in FIG. 3. Consider the tree 311 associated with process controller $A_1$. If the leaf nodes in that tree all end up to be places that are monitored, and none of those places have exceeded their maximum_token_holding_time, then $\phi \geq THT_{max}(p_1)$ can only be attributed to external conditions (i.e., other controllers). It is possible that one or more of the branches continue without ever hitting a monitored place, and return back to the starting place. The existence of such a cycle (to be referred by null-cycle, hereafter) indicates that no definite conclusion can be drawn.

The controllers $A_3$ and $A_1$ of the present example will now be examined more closely. At least two possibilities exist: (i) controller $A_3$ has been deviating from its normative operation, and has not communicated that to $A_1$ and (ii) there is a condition, say q in $A_3$ that has been marked for an amount of time $\gamma \geq THT_{max}(q)$. The former case immediately signals change in scheduling policies, and not a fault. In the latter case, if q represents a monitored condition, then the above search continues, but this time in $A_3$. If q is non-monitored, then there will eventually be a place in $A_3$ where maximum_token_holding_time will be exceeded, and thus the above search continues at that time. That implies that there may be a time lag between different controllers to search for and identify faults. As $A_3$ conducts its search, it may encounter one or more controllers that need to be involved in the search.

Figure 4:
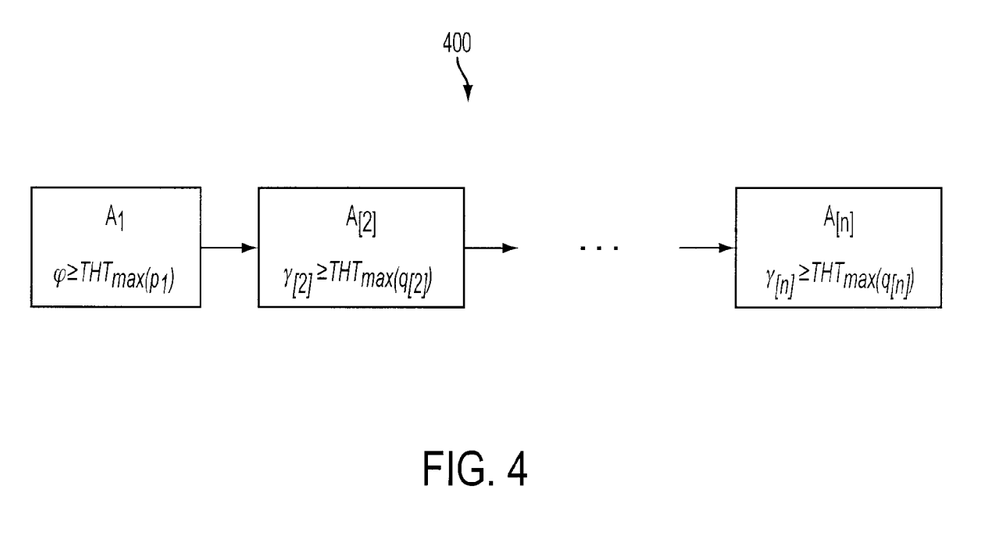
FIG. 4 is a schematic diagram showing a chain of controllers potentially accountable to an observed symptom, according to one embodiment of the invention.

The above search will eventually produce at least one chain of controllers such as the chain 400 shown in FIG. 4. The following necessary conditions hold:

(i) The chain has at least one node with the controller where the original symptom was observed.

(ii) If the search within controller $R_i$ leads to a monitored place where the maximum token holding time is exceeded, and that place receives input from at least one transition in controller $R_j$ then there is a path from $R_j$ to $R_i$ in the chain.

(iii) A controller becomes the last node in the chain if one or more of the following is true:
  a. No violation of maximum_token_holding_time condition was obtained.
  b. None of the places in that controller with the maximum_token_holding_time violation lie in any path with places or transitions connected to other controllers.
  c. If the search tree internal to that controller includes only null-cycles.

One can easily extend the above methodology to a monitoring range between (minimum_token_holding_time, maximum_token_holding_time).

For the illustrative example, the above chain may be as follows: machine $M_1$ makes a request to $R_1$ to transfer its completed part to another machine, say $M_2$. $R_1$, however, fails to respond because it is waiting for permission from $M_2$. Machine $M_2$ does not respond because it is waiting for robot $R_2$ to respond, and so on.

Method (Identify_Fault_Condition)

It is noted that the above search not only looks for those controllers potentially accountable to the observed symptom, but also indirectly attempts to identify the root causes. It does so by looking for those places within the controllers in a chain, where the condition of maximum_token_holding_time has been violated. The last controller in the chain with the violation of that condition can be a potential reason for the symptom. A detailed analysis of the search tree for that controller could reveal the exact condition or event (transition) where a potential fault has occurred.

Generally speaking, it is very much application-dependent to determine whether or not the observed symptom is a result of a fault or some planned behavior on the part of a controller. The example of a deadlock in an industrial controller environment is illustrative.

Figure 10:
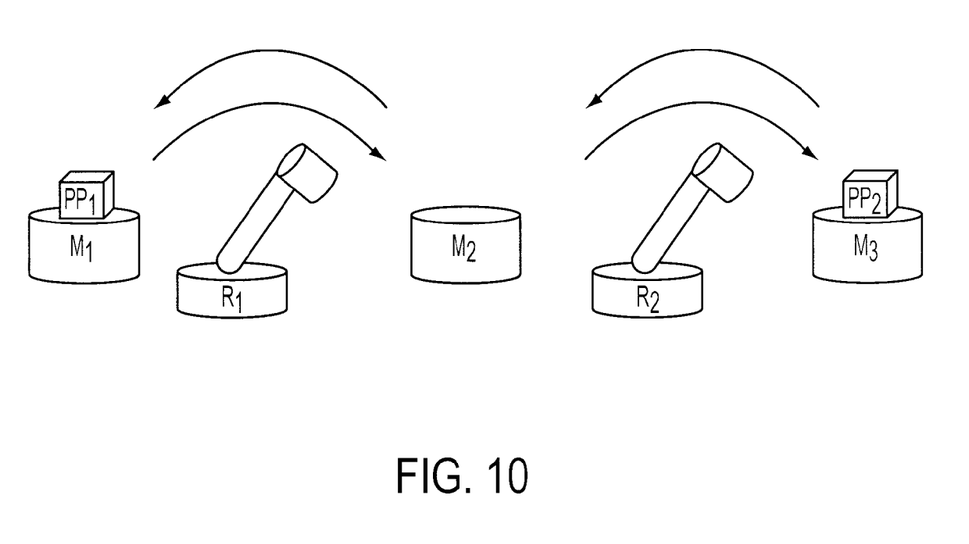
FIG. 10 is an example industrial layout showing an impending part flow deadlock.

Generally speaking, a deadlock occurs because two or more controllers require the same resource(s) or services in a circular manner during a particular time period. Consider a situation where machine $M_1$ is occupied with a part type $PP_1$ and machine $M_2$ is occupied with a part type $PP_2$. According to the process plans of $PP_1$ and $PP_2$, the part in $M_1$ must be transferred by $R_1$ (the robot) to $M_2$, and the part in $M_2$ must be transferred by $R_1$ to $M_1$. Obviously this is a deadlock situation, since we assume that $R_1$ is the only service provider controller for $M_1$ and $M_2$. Now consider another scenario, illustrated in FIG. 10: machine $M_1$ is occupied with a part of type $PP_1$ and machine $M_3$ is occupied with a part of type $PP_2$, and so on. $R_1$ is the provider of machine $M_1$ and $R_2$ is the provider of machine $M_3$. Machine $M_2$ is currently empty. According to the process plans, the part in $M_1$ must be transferred to $M_2$ and then to $M_3$ and the part in $M_3$ must be transferred to $M_2$ and then to $M_1$. Since machine $M_2$ is currently free, there is not currently a deadlock situation, but as soon as any of the robots moves the part to $M_2$, the system is deadlocked. That kind of deadlock is called an Impending Part Flow deadlock (or Second Level deadlock), meaning that the deadlock will happen in the next two steps. That example can be extended to $(n-1)^{th}$ level of deadlock, when we have n machines and n-1 robots (service providers of the machines).

To identify the fault condition, the list of controllers potentially responsible for the observed symptom is copied to all the controllers in the chain. An algorithm known in the art as the Mitchell-Merritt algorithm is then used. That algorithm works based on a Task-Wait-For Graph (TWFG), which is a digraph in which vertices represent tasks and a directed edge from T1 to T2 represents a task T1 is waiting for another task T2 due to a resource conflict. Each vertex has one private label and one public label. The private label (indicated by an index in the lower half of the node) is a unique variable and non-decreasing over time to the vertex. The public label (indicated by an index in the upper half of the node) is available to every task and is not necessarily unique. Initially the public and private labels are the same. The edges in the TWFG mean that one task is waiting for another.

Four types of state transitions are used in the Mitchell-Merritt algorithm:

(1) When a controller starts waiting for another resource it becomes a blocked controller. The labels of the blocked controller become larger than their original value, and also greater than the public label of the controller being waited on, which is also unique to the node. In the TWFG an edge is drawn from the blocked controller to the needed resource.

(2) A controller becomes active when it gets the necessary resource. The edge will be removed from the waiting vertex.

(3) A transmit step occurs when a blocked controller discovers that its public label is smaller than the public label of the resource it is waiting on. In that case the waiting controller will replace its public label with the one just read. That causes the larger labels to migrate along the edges of the TWFG.

(4) A (deadlock-) detect step occurs when a controller receives its own public label back.

It is assumed that the construction of the TWFG is initiated by the controller that experienced the symptom first. Furthermore, for that controller to construct the TWFG, the other controllers must communicate with it the state information required by the methodology.

Figure 5:
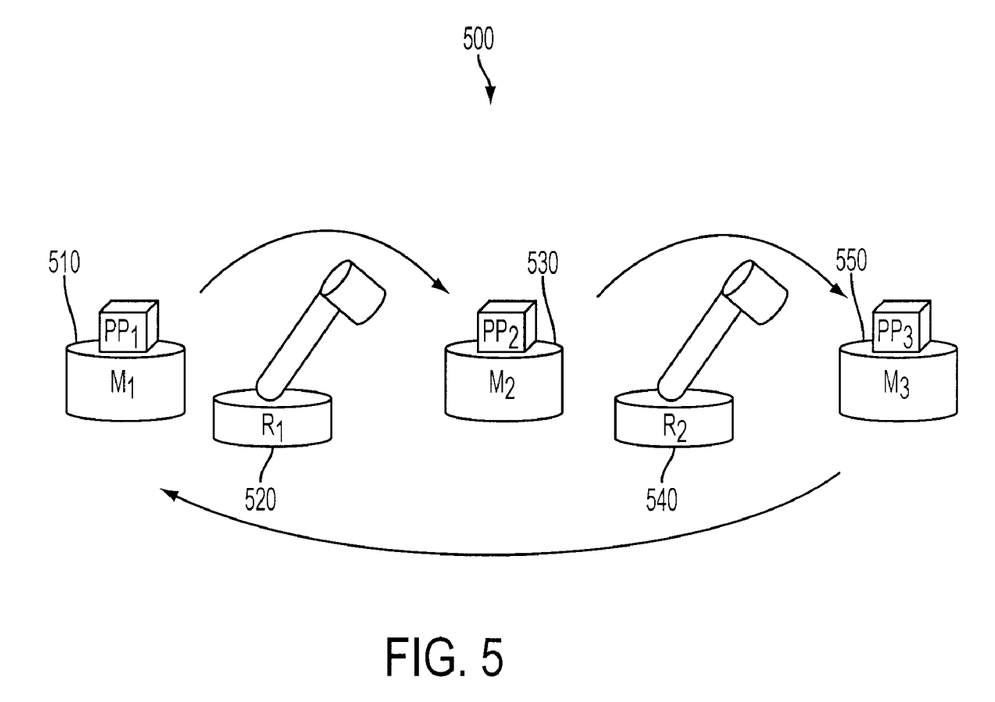
FIG. 5 is an example industrial layout showing underlying processes of a group of controllers.

To illustrate the identification of a deadlock fault condition, the subsystem 500 shown in FIG. 5 is discussed. That subsystem is a part of a larger system (not shown). It is assumed that a controller associated with machine 510 (labeled $M_1$) is the controller that observed the symptom first; i.e., that controller timed out to receive a response from the robot 520 (labeled $R_1$). Also suppose Method (Find_Other_controllers_involved) revealed the set of potential controllers $\{M_1, R_1, M_2, R_2, M_3\}$. Furthermore, the controller chain for this example is a cycle starting with $M_1$ and ending with $M_1$) A further analysis of the set of potential controllers could reveal that $R_1$) and $R_2$ are passively involved while the others are actively involved.

Figure 6:
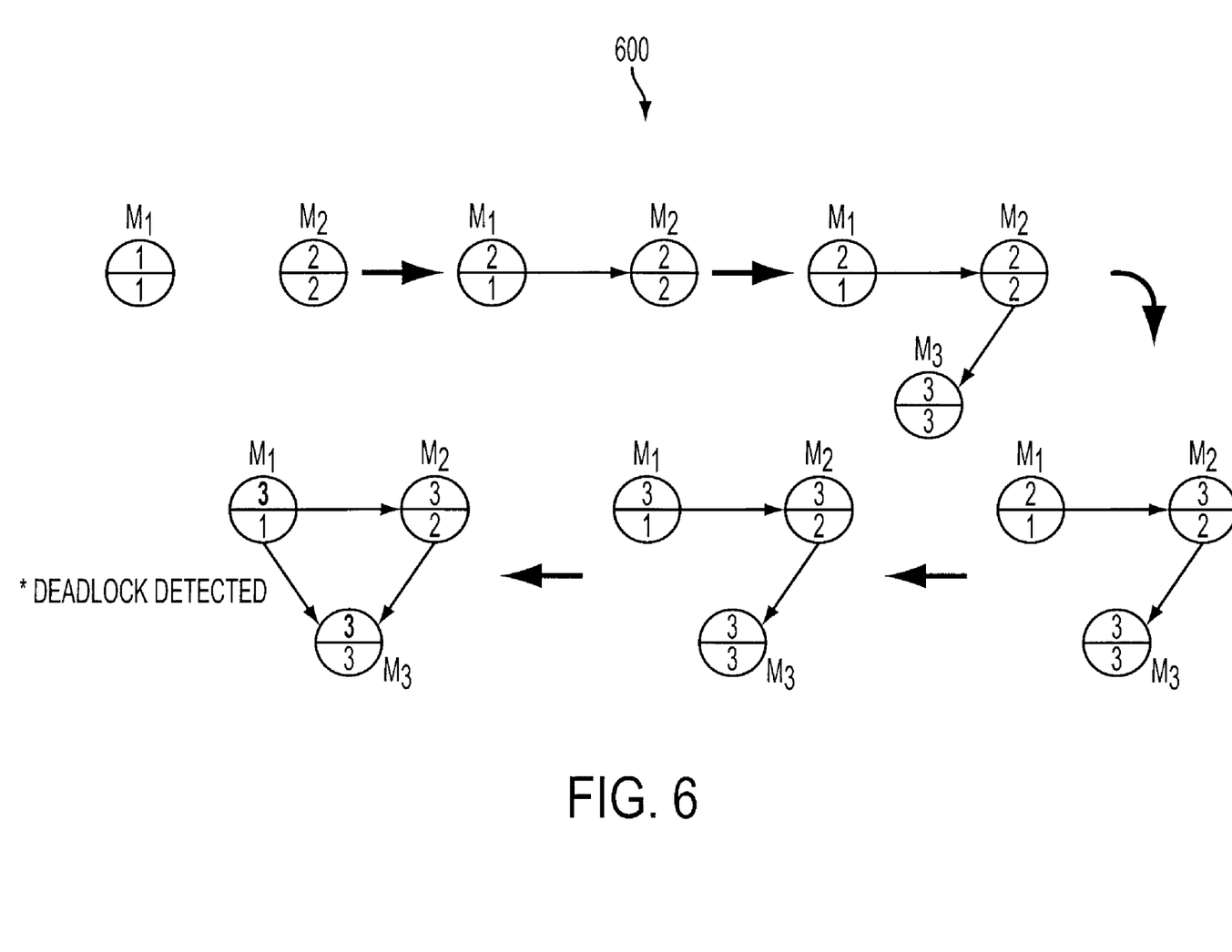
FIG. 6 is an example task-wait-for graph used in identifying a fault condition in accordance with one embodiment of the invention.

Since machine 530 (labeled $M_2$) is occupied with part of type $PP_2$, the TWFG will initially create two nodes, one each for $M_1$ and $M_2$, as shown in the TWFG of FIG. 6. The graph will be expanded because $M_2$ must wait for machine 550 (labeled $M_3$). If the public label 3 is initially assigned to node $M_3$, then the public label of $M_1$ and $M_2$ will change according to the steps of the TWFG illustrated in FIG. 6. Eventually $M_3$ will wait for $M_1$, which generated the cycle. Since both public labels are the same for $M_1$ and $M_3$, a deadlock will be detected.

Method (Reconfigure_Control_Laws)

It is assumed that the condition detected above can be resolved only using some type of manual intervention. That same condition, however, may be automatically avoided in the future in accordance with the present invention. The following is a methodology for establishing control laws that will guarantee that to happen. The term "state" will be used loosely to refer either to a place or collection of places in a PN. One notes that every finite PN can always be transferred to a finite state machine.

Every time that a fault condition is detected and identified by a controller, the set of "bad" or "to-avoid" states of all active controllers associated with that fault will be recorded by the controller and made available to all others. A particular bad state of a controller is defined within the context of a specific fault and in relation to the states of other controllers involved. The same state under different conditions may not necessarily be a bad state. A three-controller system 700 (FIG. 7) includes two faults 710, 720 (labeled Fault 1, Fault 2, respectively) that have already been detected. Fault 1 is defined by states $\{(A_1, S_{11}), (A_2, S_{12}), (A_3, S_{13})\}$, and Fault 2 is defined by states $\{(A_{22}, S_{12}), (A_3, S_{23})\}$. Those sets of states define the up-to-date to-avoid list of states. The term "state," as noted, is loosely used.

Figure 7:
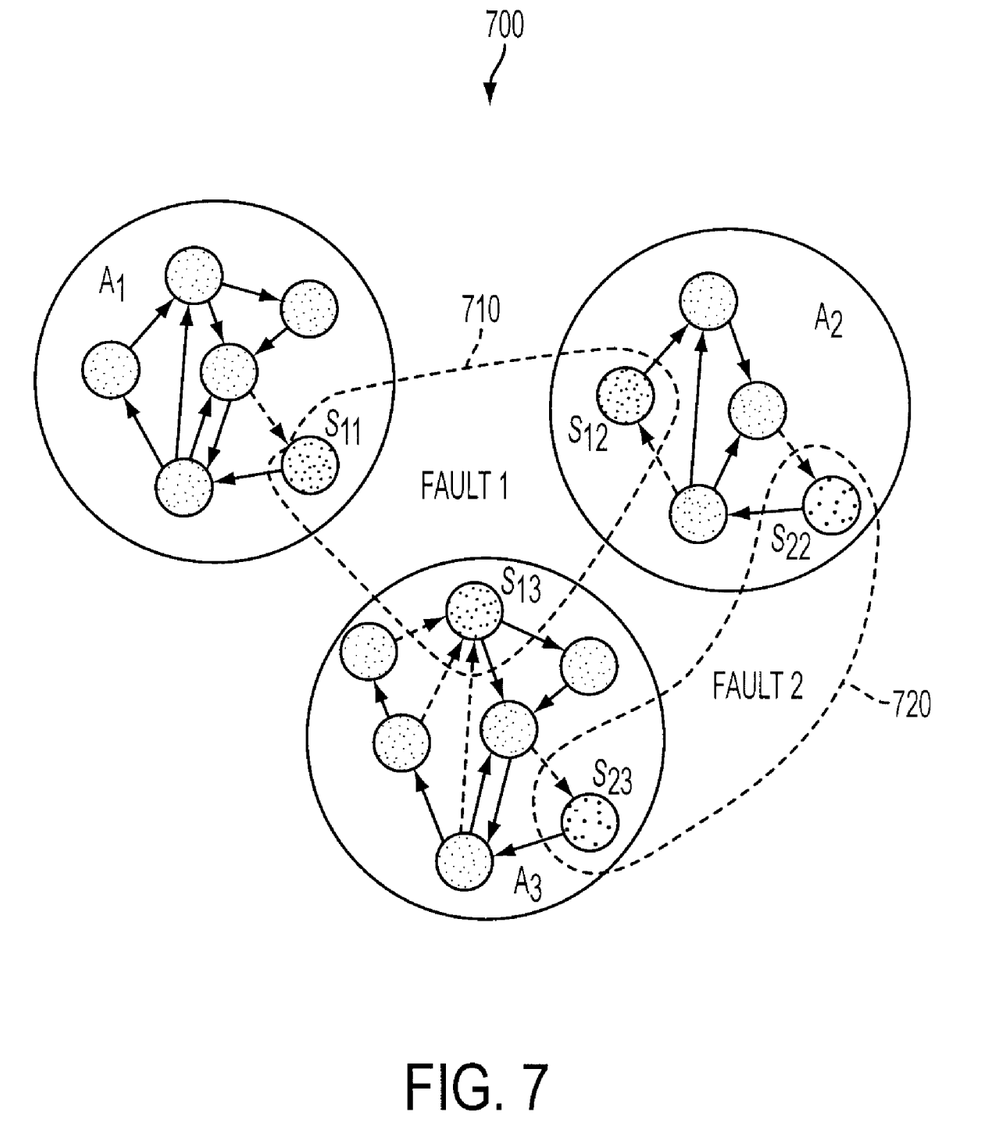
FIG. 7 is a schematic diagram showing collective fault states in two faults involving a plurality of controllers, according to one embodiment of the invention.

Consider Fault 1 above. Every time that controller $A_1$ attempts to make a transition to state $S_{11}$ and prior to that happening, $A_1$ must communicate with controllers $A_2$ and $A_3$. Now if both $A_2$ and $A_3$ are in their respective Fault 1 states, i.e., $S_{12}$ and $S_{13}$, then $A_1$ must halt transition to state $S_{11}$. As shown in FIG. 7, transitions within each controller's control, that must be disabled under those fault conditions, are presented with dotted lines.

Figure 8:
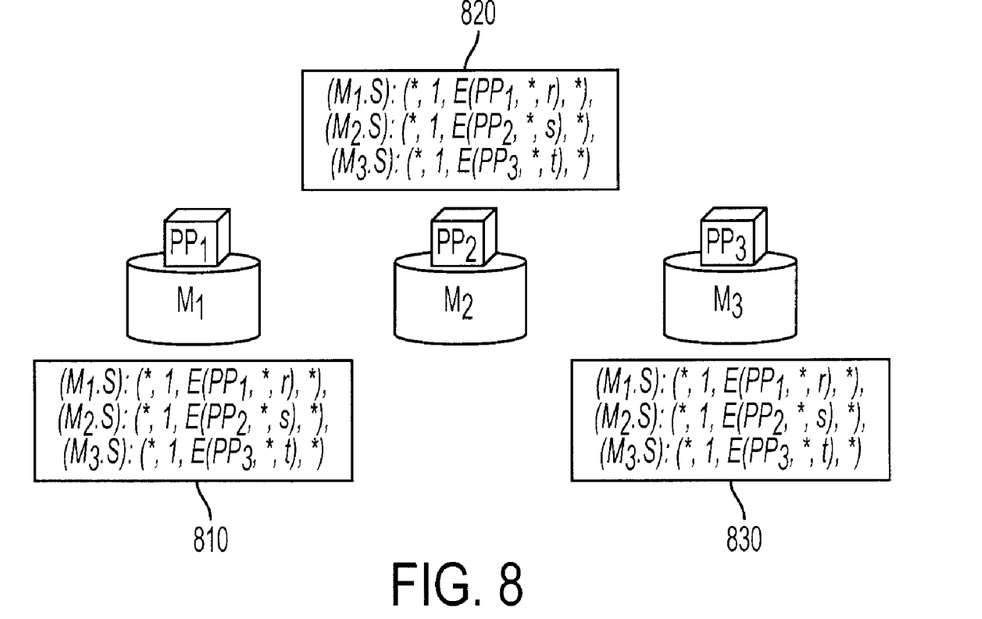
FIG. 8 is an illustration of to-avoid lists, according to one embodiment of the invention.

In the example described above with reference to FIG. 5, a deadlock state for the three active controllers $M_1$, $M_2$, and $M_3$ is illustrated. A "to-avoid" list of states 810, 820, 830 shared among the three controllers is illustrated in FIG. 8. It is noted that:

(a) The state of every machine includes the state of the object being worked on. "*" represents state elements that are kept by the controller itself, but need not be shared among the various controllers. For instance, the availability of the machines do not affect the deadlock situation; therefore, those are considered as don't care ("*").

(b) It is assumed the current stage numbers of the parts are presented by r, s and t.

Figure 9:
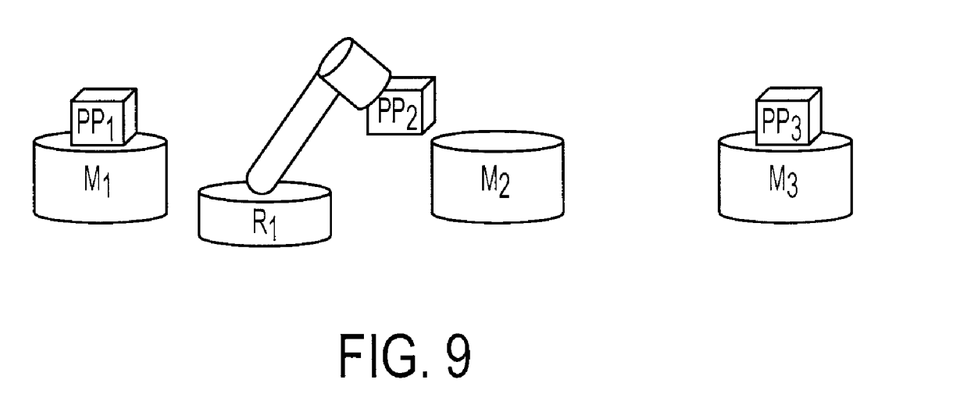
FIG. 9 is an example industrial layout showing a state before a deadlock.

Now suppose that the system is at the state shown in FIG. 9. Assume that the state of the part of type $PP_1$ is $E(PP_1, r)$, the state of the part of type $PP_2$ is $E(PP_2, s-1)$ and the state of the part of type $PP_3$ is $E(PP_3, t)$. Let us assume that $PP_2$ has to be taken from its current location (say controller $M_4$ which is not shown in the figure) and transferred to $M_2$ (according to a given process plan). Robot $R_1$ will send a request to $M_2$ and will wait for its response. $M_2$ will predict its next state which is $M_2S$: (*, 1, $E(PP_2, *, s)$, *). It will compare its to-avoid list with the predicted state. Since there is a match, $M_2$ will send queries to $M_1$ and $M_3$ $M_1$ and $M_1$ will respond to those queries by sending their current states to $M_2$ Since the current states of $M_3$ and $M_3$ match with the states in the to-avoid list of $M_2$ will conclude that the system will deadlock if it makes that move. Therefore it will not accept the request of $R_1$ and the robot will not take the part from $M_4$ until $M_1$ or $M_3$ change their states.

Further Work

The inventors have investigated the application of the above online framework in industrial automation control systems. For example, an online distributed system was implemented in an agent-based factory control using a Siemens PLC. In that case, the process controllers were integrated in a distributed work flow wherein different types of work pieces were manufactured on the same shop floor. The manufacturing process for each type of work piece included different processing procedures, and each procedure could be executed by multiple machines. Robots were used in transferring the work pieces between machines. For each step of the work piece processing, the available machines bid for the work flow. The bidding algorithm was successfully demonstrated using PLC programming in the distributed process controllers. While the particular fault detection algorithms described herein were not implemented, the work demonstrated the ability of a PLC to handle a complex online framework.

The inventors have furthermore used Siemens Win AC, a software-based PLC, to implement complex agent algorithms such as modeling, reasoning, and fault detection. For example, model-based fault detection was implemented in an agent-based freshwater cooling system using Win AC. In that demonstration, if an observation was not consistent with the model prediction, the system determined that a fault had occurred. The model-based reasoning engine was used to perform diagnosis of the system. Further work is contemplated to improve detection of concurrent faults, and to improve performance in the case of multiple causes of a single fault.

CONCLUSION

A formal methodology was described for online fault detection and avoidance of distributed industrial control systems. That formulation provides a generic solution for recognizing fault propagation. The formulation was specifically applied to unknown deadlock conditions in a manufacturing application.

The generic methods are very much application-dependent. In the deadlock application, the assumption was made that the controller's environment is deterministic and fully observable and the agent is not subject to failures.

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. For example, while the technique is described primarily for use in connection with factory process control systems, those skilled in the art will understand that the technique may be used as well in connection with other types of control systems. For example, it is expected that the method of the invention will perform well in distributed power generation systems and cogeneration systems, since extensive coordination is required to keep such systems operational. It is to be understood that the embodiments shown and described herein are only illustrative of the principles of the present invention and that various modifications may be implemented by those skilled in the art without departing from the scope and spirit of the invention.

What is claimed is:

1. A method for detecting and avoiding faults in a distributed factory control system having a plurality of industrial controllers, each said controller controlling at least one underlying process, the method comprising:
   in a first controller, identifying a symptom of a fault condition by identifying a deviation of a state of an underlying process controlled by the first controller from a corresponding state kept by the controller;
   in the first controller, measuring a persistence of the symptom, and ignoring the symptom if the measured persistence is below a threshold value;
   finding other controllers involved in the fault condition by generating in at least the first controller a search tree having leaf nodes that are monitored conditions;
   identifying the fault condition including identifying states of the other controllers involved in the fault condition; and
   reconfiguring control rules controlling states of the involved controllers to avoid the fault condition in the future;
   wherein finding other controllers involved in the fault condition further comprises:
   starting the search tree at a state where place $p_1$ of a time Petri net is marked for an amount of time $\phi \geq THT_{max}(p_1)$ where $THT_{max}(p_1)$ is a maximum token holding time of place $p_1$;
   if none of the leaf nodes of the search tree in the first controller exceeds its maximum token holding time, then generating a search tree in a second controller starting at a place q of a time Petri net that is an output of a transition $t_1$ to which $p_1$ is an input; and
   creating a chain of controllers by repeating the generating a search tree step in additional controllers until one of the following conditions is met:
   a. maximum token holding time condition is not exceeded in any leaf node in a search tree;
   b. none of the places in a controller where the maximum token holding time has been exceeded lies in any path with places or transitions connected to other controllers; and
   c. a search tree within a controller contains only null-cycles.

2. The method of claim 1, wherein identifying a symptom of a fault condition further comprises:
   identifying the state of an underlying process controlled by the first controller by observing sensory devices associated with the underlying process.

3. The method of claim 1, wherein identifying a symptom of a fault condition further comprises:
   modeling in the first controller at least one underlying process using a time Petri net.

4. The method of claim 1, wherein identifying the fault condition further comprises:
   analyzing a search tree of a last controller in the chain of controllers where maximum token holding time has been exceeded.

5. The method of claim 1, wherein identifying the fault condition further comprises:
   generating in the first controller a Task-Wait-For graph using state information acquired from at least one other controller.

6. A method for detecting and avoiding faults in a distributed factory control system having a plurality of industrial controllers, each said controller controlling at least one underlying process, the method comprising:
   in a first controller, identifying a symptom of a fault condition by identifying a deviation of a state of an underlying process controlled by the first controller from a corresponding state kept by the controller;
   in the first controller, measuring a persistence of the symptom, and ignoring the symptom if the measured persistence is below a threshold value;
   finding other controllers involved in the fault condition by generating in at least the first controller a search tree having leaf nodes that are monitored conditions;
   identifying the fault condition including identifying states of the other controllers involved in the fault condition; and
   reconfiguring control rules controlling states of the involved controllers to avoid the fault condition in the future, including:
   transmitting from the first controller to at least one active controller associated with the fault condition a list of "to avoid" states.

7. The method of claim 6, further comprising:
receiving at the first controller a state of each controller associated with the fault condition, and
comparing the received states with the list of "to avoid" states to determine whether to disable a transition that is within the first controller's control.

8. The method of claim 7, wherein the first controller controls a process performed on a part, and wherein a state of the first controller includes a state of the part.

9. The method of claim 6, wherein identifying a symptom of a fault condition further comprises:
identifying the state of an underlying process controlled by the first controller by observing sensory devices associated with the underlying process.

10. The method of claim 6, wherein identifying a symptom of a fault condition further comprises:
modeling in the first controller at least one underlying process using a time Petri net.

11. The method of claim 6, wherein identifying the fault condition further comprises:
analyzing a search tree of a last controller in the chain of controllers where maximum token holding time has been exceeded.

12. The method of claim 6, wherein identifying the fault condition further comprises:
generating in the first controller a Task-Wait-For graph using state information acquired from at least one other controller.

13. A computer program product comprising a computer readable recording medium having recorded thereon a computer program comprising code means for, when executed on an industrial controller, instructing said controller to control steps in a method for detecting and avoiding faults in a distributed factory control system having a plurality of industrial controllers, each said controller controlling at least one underlying process, the method comprising:
in a first controller, identifying a symptom of a fault condition by identifying a deviation of a state of an underlying process controlled by the first controller from a corresponding state kept by the controller;
in the first controller, measuring a persistence of the symptom, and ignoring the symptom if the measured persistence is below a threshold value;
finding other controllers involved in the fault condition by generating in at least the first controller a search tree having leaf nodes that are monitored conditions;
identifying the fault condition including identifying states of the other controllers involved in the fault condition; and
reconfiguring control rules controlling states of the involved controllers to avoid the fault condition in the future;
wherein finding other controllers involved in the fault condition further comprises:
starting the search tree at a state where place $p_1$ of a time Petri net is marked for an amount of time $\phi \geq THT_{max}(p_1)$ where $THT_{max}(p_1)$ is a maximum token holding time of place $p_1$;
if none of the leaf nodes of the search tree in the first controller exceeds its maximum token holding time, then generating a search tree in a second controller starting at a place q of a time Petri net that is an output of a transition $t_1$ to which $p_1$ is an input; and
creating a chain of controllers by repeating the generating a search tree step in additional controllers until one of the following conditions is met:

a. maximum token holding time condition is not exceeded in any leaf node in a search tree;
b. none of the places in a controller where the maximum token holding time has been exceeded lies in any path with places or transitions connected to other controllers; and
c. a search tree within a controller contains only null-cycles.

14. The computer program product of claim 13, wherein identifying a symptom of a fault condition further comprises:
identifying the state of an underlying process controlled by the first controller by observing sensory devices associated with the underlying process.

15. The computer program product of claim 13, wherein identifying a symptom of a fault condition further comprises:
modeling in the first controller at least one underlying process using a time Petri net.

16. The computer program product of claim 13, wherein identifying the fault condition further comprises:
analyzing a search tree of a last controller in the chain of controllers where maximum token holding time has been exceeded.

17. The computer program product of claim 13, wherein identifying the fault condition further comprises:
generating in the first controller a Task-Wait-For graph using state information acquired from at least one other controller.

18. A computer program product comprising a computer readable recording medium having recorded thereon a computer program comprising code means for, when executed on an industrial controller, instructing said controller to control steps in a method for detecting and avoiding faults in a distributed factory control system having a plurality of industrial controllers, each said controller controlling at least one underlying process, the method comprising:
in a first controller, identifying a symptom of a fault condition by identifying a deviation of a state of an underlying process controlled by the first controller from a corresponding state kept by the controller;
in the first controller, measuring a persistence of the symptom, and ignoring the symptom if the measured persistence is below a threshold value;
finding other controllers involved in the fault condition by generating in at least the first controller a search tree having leaf nodes that are monitored conditions;
identifying the fault condition including identifying states of the other controllers involved in the fault condition; and
reconfiguring control rules controlling states of the involved controllers to avoid the fault condition in the future; including:
transmitting from the first controller to at least one active controller associated with the fault condition a list of "to avoid" states.

19. The computer program product of claim 18, wherein the method further comprises:
receiving at the first controller a state of each controller associated with the fault condition, and
comparing the received states with the list of "to avoid" states to determine whether to disable a transition that is within the first controller's control.

20. The computer program product of claim 19, wherein the first controller controls a process performed on a part, and wherein a state of the first controller includes a state of the part.

21. The computer program product of claim 18, wherein identifying a symptom of a fault condition further comprises:

identifying the state of an underlying process controlled by the first controller by observing sensory devices associated with the underlying process.

22. The computer program product of claim 18, wherein identifying a symptom of a fault condition further comprises:

modeling in the first controller at least one underlying process using a time Petri net.

23. The computer program product of claim 18, wherein identifying the fault condition further comprises:

analyzing a search tree of a last controller in the chain of controllers where maximum token holding time has been exceeded.

24. The computer program product of claim 18, wherein identifying the fault condition further comprises:

generating in the first controller a Task-Wait-For graph using state information acquired from at least one other controller.

* * * * *